(12) United States Patent
Johnson

(10) Patent No.: US 10,346,337 B1
(45) Date of Patent: Jul. 9, 2019

(54) OFFLOAD PIPELINE FOR DATA MIRRORING

(71) Applicant: Amazon Technologies, Inc., Seattle, WA (US)

(72) Inventor: Robert Michael Johnson, Austin, TX (US)

(73) Assignee: Amazon Technologies, Inc., Seattle, WA (US)

(*) Notice: Subject to any disclaimer, the term of this patent is extended or adjusted under 35 U.S.C. 154(b) by 121 days.

(21) Appl. No.: 14/673,466

(22) Filed: Mar. 30, 2015

(51) Int. Cl.
*G06F 13/36* (2006.01)
*G06F 13/40* (2006.01)
*G06F 13/42* (2006.01)
*G06F 13/28* (2006.01)

(52) U.S. Cl.
CPC ........ *G06F 13/4022* (2013.01); *G06F 13/287* (2013.01); *G06F 13/423* (2013.01)

(58) Field of Classification Search
CPC ... G06F 13/287; G06F 13/423; G06F 13/4022
USPC ........................................................ 710/306
See application file for complete search history.

(56) References Cited

U.S. PATENT DOCUMENTS

| | | |
|---|---|---|
| 2003/0236851 A1 | 12/2003 | Cuddihy et al. |
| 2005/0256972 A1 | 11/2005 | Cochran et al. |
| 2007/0005833 A1 | 1/2007 | Seto et al. |
| 2011/0219208 A1 | 9/2011 | Asaad et al. |
| 2012/0317390 A1* | 12/2012 | Bickelman ............. G06F 13/14 711/173 |
| 2013/0232378 A1 | 9/2013 | Resch et al. |
| 2013/0339600 A1* | 12/2013 | Shah ...................... G06F 3/067 711/114 |
| 2014/0007189 A1 | 1/2014 | Huynh et al. |
| 2014/0115228 A1* | 4/2014 | Zhou .................. G06F 9/45533 711/102 |
| 2014/0189380 A1 | 7/2014 | Colpo et al. |
| 2014/0244866 A1* | 8/2014 | Manula .................. G06F 13/28 710/27 |
| 2015/0381491 A1 | 12/2015 | Graham et al. |

OTHER PUBLICATIONS

U.S. Appl. No. 14/748,131, filed Jun. 23, 2015, Titled: Offload Pipeline for Data Mirroring or Data Striping for a Server.
U.S. Appl. No. 14/748,133, filed Jun. 23, 2015, Titled: Offload Pipeline for Data Copying.

* cited by examiner

*Primary Examiner* — Chun Kuan Lee
(74) *Attorney, Agent, or Firm* — Kilpatrick Townsend & Stockton LLP

(57) ABSTRACT

An Input/Output (I/O) adapter device coupled to a host device can perform data mirroring or data striping of payload data for transmitting to multiple network destinations. In some embodiments, a virtual machine running on the host device or on the I/O adapter device may be aware of the capabilities of the I/O adapter device to perform data mirroring or data striping and configure the I/O adapter device for performing data mirroring or data striping operations. In some embodiments, a virtual machine may be agnostic to the capabilities of the I/O adapter device to perform data mirroring or data striping and the I/O adapter device may perform data mirroring or data striping "under the hood" or without being configured by the virtual machine.

20 Claims, 8 Drawing Sheets

OFFLOAD PIPELINE FOR DATA MIRRORING

BACKGROUND

Server computers often include one or more input/output (I/O) devices. For example, a server computer may include one or more I/O adapter devices for communicating with a network. Each I/O device may communicate over multiple, possibly asynchronous interfaces, such as Peripheral Component Interconnect Express (PCIe) and/or Ethernet. For example, the host server computer may send I/O transactions over a PCIe bus to the I/O adapter device, and the I/O adapter device may send those I/O transactions over an Ethernet cable for processing by another server.

In some instances, one or more virtual machines may be running on the host server computer which can send data over the PCIe bus to the I/O adapter device. For example, the virtual machines may send the data via the I/O adapter device to multiple network destinations for further processing, e.g., storage, data processing and warehousing, archive and many other tasks. In some instances, a virtual machine running on the host server computer may perform data mirroring to send the replicated data to multiple network destinations. For example, the virtual machine may send multiple copies of the same data over the PCIe bus to the I/O adapter device for sending to the multiple network destinations for fault tolerance purposes. Sending each copy of the data over the PCIe bus from the host memory to the I/O adapter device may not only consume lot of bandwidth between the host server computer and the I/O adapter device but may also slow down the performance of the host server computer for other important tasks.

BRIEF DESCRIPTION OF THE DRAWINGS

Various embodiments in accordance with the present disclosure will be described with reference to the drawings, in which.

DETAILED DESCRIPTION

Figure 1:
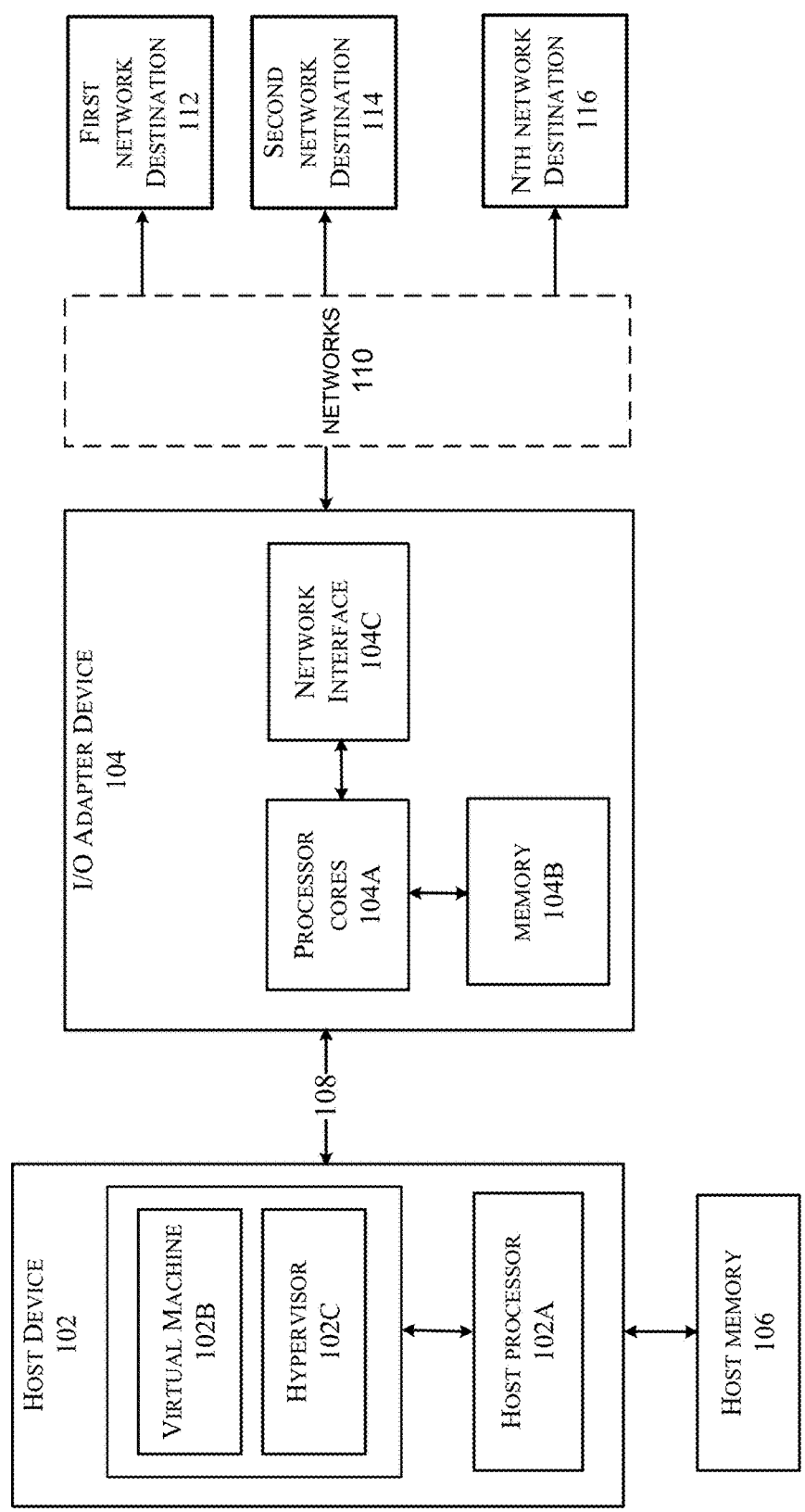
FIG. 1 illustrates a system comprising a typical I/O adapter device in communication with a host device and a plurality of network destinations.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Typically, applications running on a host server computer or a host device may perform their own data mirroring for storing data in multiple different locations to avoid a single point of failure. In some instances, some applications may perform data striping to split the data into multiple segments before storing the data. For example, an application may be a virtual machine that may be associated with a database application such as Oracle®, MongoDB®, etc., which may be running on the host device. In some instances, the virtual machine can store the data or segments of the data in a host memory. The virtual machine can use an I/O device to send each copy or segment of the data to the multiple different locations over one or more networks. Typically, the virtual machine sends each copy or segment of the data to the I/O device over a host interface such as a PCIe interface. For example, the I/O device can fetch each copy or segment of the data from the host memory via the host interface and forward it to a network location. However, sending multiple copies or segments of the data by the virtual machine over the host interface can consume lot of bandwidth and affect the performance of the host device for other important tasks.

Various embodiments of the disclosed technologies can allow an I/O adapter device to perform data mirroring or data striping on the data for transmitting to multiple network destinations. In one embodiment, a virtual machine running on the host device may be aware of the capabilities of the I/O adapter device to perform data mirroring or data striping and may configure the I/O adapter device to offload the data mirroring or data striping functionalities to be performed by the I/O adapter device. In another embodiment, a virtual machine running on the host device may be agnostic to the capabilities of the I/O adapter device to perform data mirroring or data striping and the I/O adapter device may perform data mirroring or data striping "under the hood" or without being configured by the virtual machine. In one embodiment, the I/O adapter device may perform data mirroring or data striping for a virtual machine running on the I/O adapter device itself.

In some embodiments, the I/O adapter device may receive an I/O request from a virtual machine running on a host device for a transaction. For example, the transaction may include a transaction for writing into a memory (e.g., remote storage) or a transaction for network services such as traffic monitoring or network processing. The I/O adapter device can fetch payload data for the transaction once from the host memory using a host interface between the host device and the I/O adapter device. In one embodiment, the I/O adapter device can store the payload data in a payload buffer on the I/O adapter device to minimize the use of host interface. In another embodiment, the I/O adapter device can directly process the payload data (e.g., perform data mirroring or data striping on the payload data) without storing in the payload buffer. In one embodiment, the I/O adapter device can provide data mirroring functionality by replicating the payload data for transmitting to different destinations on the network without fetching each copy of the payload data from the host memory through the host interface. In one embodiment, the I/O adapter device can provide data striping functionality by splitting the payload data into multiple segments for transmitting to different network destinations without fetching each segment of the payload data from the host memory through the host interface. In some embodiments, the I/O adapter device can encode (e.g., compress, encrypt, etc.) the payload data before processing the payload data, thus minimizing the use of compression and/or encryption for each copy or segment of the payload data.

Various embodiments of the disclosed technologies can minimize traversing the host interface between the host device and the I/O adapter device by processing the payload data on the I/O adapter device to provide data mirroring or data striping functionalities for transmitting to multiple network destinations. The transmitted data can then be stored in multiple storage devices on the network. This may allow for more headroom for other processing by the host device, can improve utilization of resources on the host device and can reduce cost which can result in lower costs for the end users.

FIG. 1 illustrates a system 100 comprising an I/O adapter device in communication with a host device and a plurality of network destinations. Typically, a virtual machine running on the host device may perform data mirroring on the host device to send multiple copies of the data via the I/O adapter device for storing in the plurality of network destinations. For example, the virtual machine may store the payload data in a host memory to replicate the data. Generally, the virtual machine may send multiple copies of the payload data over an interface (e.g., Peripheral Component Interconnect Express (PCIe) interface) to the I/O adapter device for storing in the plurality of network destinations via a network. Similarly, a virtual machine may perform data striping on the host device to split the data in multiple segments and store the multiple segments in the host memory for sending to the plurality of network destinations via the I/O adapter device. This may result in poor utilization of the bandwidth and resources of the host device, thus resulting in the reduced throughput of the system.

The system 100 may include an I/O adapter device 104 coupled to a host device 102 and a plurality of network destinations, e.g., a first network destination 112, a second network destination 114 and an Nth network destination 116. The I/O adapter device 104 may be communicatively coupled to the plurality of network destinations via one or more networks 110. The host device 102 may be coupled to a host memory 106. The I/O adapter device 104 may be configured to communicate with the host device 102 using a host interface 108. For example, the host interface 108 may be a standard interface such as the PCIe interface.

In some instances, the host device 102 may include a server, for example, an x86 server. The host device 102 may provide a multi-tenant platform to multiple clients. For example, the host device 102 may provide services such as cloud computing, cloud storage, analytics, web services, databases, applications, deployment services, website hosting, etc. to different clients. The I/O adapter device 104 may be a plug-in module, an expansion card or any such electronic circuit, e.g., network interface controller, video card, sound card, USB (Universal Serial Bus) device, Wi-Fi device, etc. that may provide network or compute service for the host device 102.

The host device 102 may include a host processor 102A that may be configured to execute a plurality of instructions. For example, the instructions may be stored in a computer readable medium (not shown) that may be residing on the host device 102 or be part of the host memory 106. The host device 102 may be configured to execute a virtual machine 102B. Note that the host device 102 may execute a plurality of virtual machines, however, for ease of simplicity, only virtual machine 102B is shown in FIG. 1. The virtual machine 102B may be any suitable emulation of a computer system that may be managed by a hypervisor 102C. The hypervisor 102C may be configured to manage the virtual machine 102B, for example, to create, start, monitor, stop or to delete the virtual machine 102B. The hypervisor 102C may be implemented as a piece of compute software, firmware or hardware.

The host memory 106 may be coupled to the host device 102 or may be part of the host device 102. Some non-limiting examples of the host memory 106 may include Dynamic Random Access Memory (DRAM), Synchronous DRAM (SDRAM), Double Data Rate (DDR) SDRAM, etc. In some embodiments, the host memory 106 may be coupled to the host processor 102A via a memory controller (not shown). The host memory 106 may be used to store the payload data, copies of the payload data, segments of the payload data or any other relevant data.

In some instances, the virtual machine 102B may execute a data mirroring application on the host device 102 for a database, e.g., Oracle DB®, MongoDB®, etc. For example, the data mirroring may be performed to send copies of the same data for storing in multiple destinations to increase its availability in the event of a failure or to decrease response time. For example, redundant copies of the data may be stored in different storage devices, e.g., different physical devices and/or at different physical locations. Data mirroring can provide speedy recovery of the data, e.g., if one destination is down, the data may be accessed from another destination.

In some instances, the virtual machine 102B may execute a data striping application on the host device 102. For example, data striping may be performed to split the data in multiple segments for storing in multiple storage devices to improve the data throughput, e.g., faster write and read accesses of the stored data. Data striping may allow accessing the stored data segments concurrently from multiple storage devices, thus improving the I/O performance. In some instances, data striping can be used to balance the I/O load across an array of storage disks.

The I/O adapter device 104 may include processor cores 104A, memory 104B and a network interface 104C. The processor cores 104A may be configured to execute a plurality of instructions collectively on one or more processors of the processor cores 104A. Some non-limiting examples of the processor cores 104A may include ARM's cortex A57, MIPS, AMD Phenom, Intel ATOM, etc. The instructions may be stored on a computer-readable storage medium, for example, in the form of a computer program. The computer-readable storage medium may be non-transitory. In some instances, the computer readable medium may be part of the memory 104B. The memory 104 may be internal or external to the I/O adapter device 104. For example, the memory 104B may be a RAM, ROM, Electrically Erasable Programmable Read-Only Memory (EEPROM), flash memory or any suitable storage media. In some embodiments, the processor cores 104A may share certain resources, such as busses and Level 1 (L1) caches and/or Level 2 (L2) caches between each of the processor cores.

In some instances, the I/O adapter device 104 may present itself as multiple virtual devices to the host device 102. Virtual machines (e.g., the virtual machine 102B) running on the host device 102 may use a virtual device on the I/O adapter device 104 as if the virtual device were a physical device. For example, the I/O adapter device 104 may emulate a plurality of devices using the processor cores 104A, such as virtual processors, virtual network interface cards, etc. In some instances, the virtual machine 102B may use a virtual device on the I/O adapter device 104 for storing data in a local storage device or multiple storage devices across the network. Some non-limiting examples of the emulated devices on the I/O adapter device 102 may include network interface controllers, network processors, storage controllers, etc.

The network interface 104C may be any suitable interface for the I/O adapter device 104 to communicate with the plurality of network destinations via the one or more networks 110. In some instances, the networks 110 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc. For example, in one instance, the network interface 104C may include a physical Ethernet port. In another instance, the network interface 104C may be a virtual network interface that can share the same physical Ethernet port with one or more other virtual network interfaces.

In some instances, multiple network destinations, e.g., the first network destination 112, second network destination 114 and the Nth network destination 116 may be different server computers that may be coupled to different storage devices, e.g., hard discs, solid state drives (SSDs), compact discs, magnetic tapes, USB portable drives, etc. For example, the multiple network destinations may be different server nodes. In some instances, each of the network destinations may be coupled to one or more storage devices. For example, the first network destination 112 may be coupled to a hard disc and a USB portable drive, the second network destination 114 may be coupled to a SDD drive, and so on. In some instances, the first network destination 112, second network destination 114 and the Nth network destination 116 may include a plurality of storage devices that may be coupled to the same server computer for storing multiple copies of the payload data in different storage devices. For example, a first copy of the payload data may be stored in a first storage device (e.g., hard disc), a second copy may be stored in a second storage device (e.g., compact disc), and so on. In some instances, one or more of the network destinations may be part of a Storage Area Network (SAN).

Typically, the virtual machine 102B may execute a data mirroring application on the host device 102 and may send each copy of the data via the host interface 108 to the I/O adapter device 104. For example, the virtual machine 102B may send each copy of the data to a virtual device emulated on the I/O adapter device 104 that may be configured to transmit each copy of the data to a storage device over the network. In some instances, the host interface 108 may be a PCIe interface. For example, each of the host device 102 and the I/O adapter device 104 may include PCIe controllers (not shown) for transferring each copy of the data from the host device 102 to the I/O adapter device 104. The I/O adapter device 104 may send each copy of the data to a network destination using the network interface 104C. For example, a first copy of the data may be sent to the first network destination 112 via the networks 110 and a second copy of the data may be sent to the second network destination 114 via the networks 110 and so on. It will be understood that in some instances, the networks 110 may include multiple networks and different network destinations may use or share one or more networks of the networks 110. For example, the first network destination 112 and the second network destination 114 may share a first network (e.g., an Ethernet network) of the networks 110 for data transfer and the Nth destination device 116 may use a second network (e.g., a Wi-Fi network) of the networks 110 for data transfer. Further, multiple copies of the data may be transmitted to different network destinations sequentially, in parallel or a combination of both.

In some instances, the virtual machine 102B may execute a data striping application on the host device 102 to split the data into multiple segments (e.g., stripes) for transmitting to multiple network destinations. For example, data striping may be performed to store multiple segments of data into different storage locations to provide increased throughput for data accesses, e.g., segments of data can be retrieved in parallel from different storage locations, thus increasing system performance. In some instances, error correction bits may also be stored to help retrieve the data in case of data corruption (e.g., failure of a storage device). In some instances, the multiple data segments may be stored in the host memory 106. The virtual machine 102B may send each data segment via the host interface 108 to the I/O adapter device 104. The I/O adapter device 104 may send each data segment to a network destination using the network interface 104C. For example, the virtual machine 102B may send each segment of the data to a virtual device emulated on the I/O adapter device 104 that may be configured to transmit each segment of the data to a storage device over the network. For example, a first data segment may be transmitted to the first network destination 112, a second data segment may be transmitted to the second network destination 116 and so on.

As discussed above with reference to FIG. 1, typically, the virtual machine 102B executing a data mirroring or data striping application on the host device 102 may store the data or segments of the data in the host memory 106 to send multiple copies or segments of the data via the host interface 108 to the I/O adapter device 104 for transmitting to multiple different network destinations. This may result in poor utilization of the host device 102 resources and reduced memory bandwidth since the I/O adapter device 104 may fetch each copy or segment of data from the host memory 106 via the host interface 108.

Figure 2:
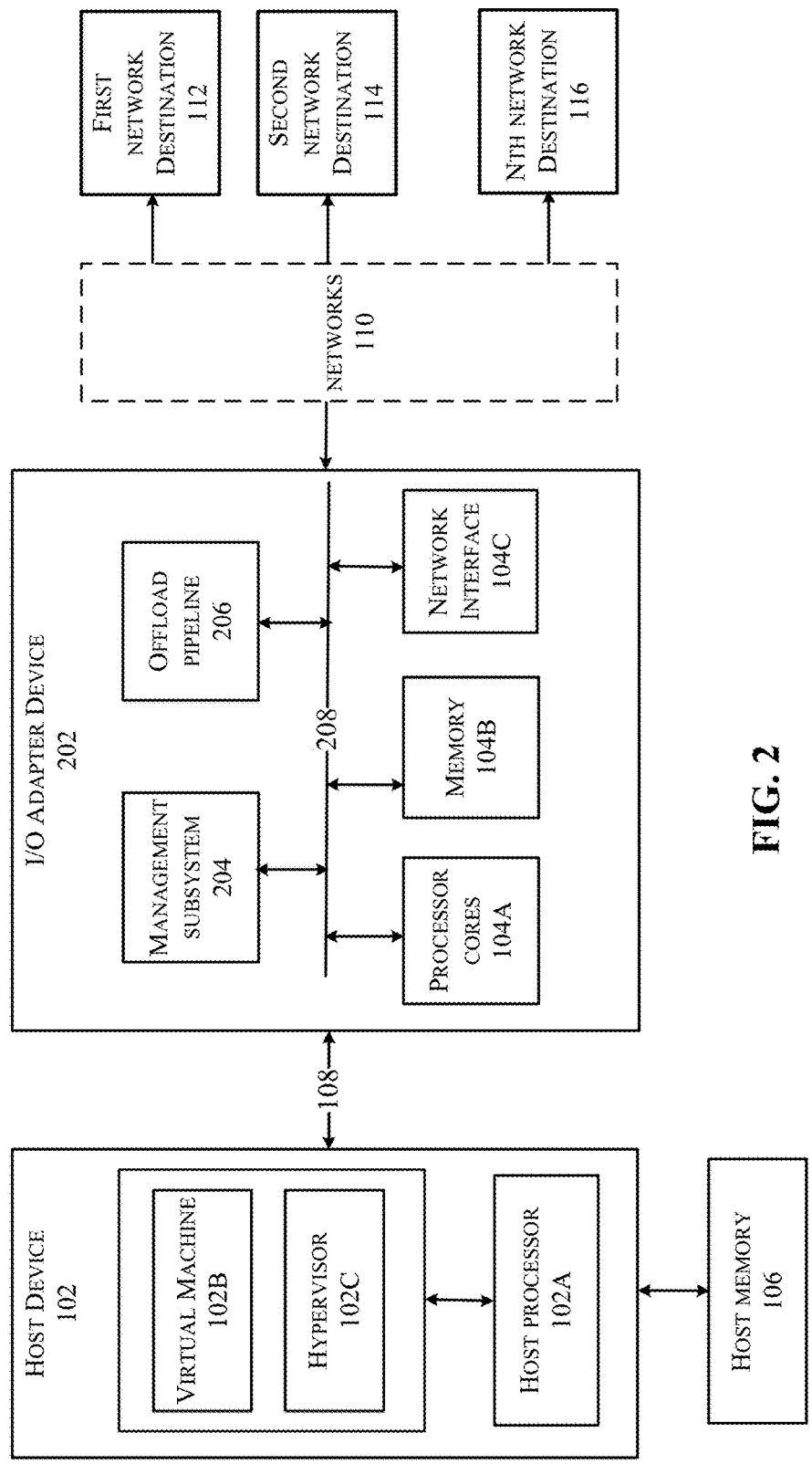
FIG. 2 illustrates a system with an I/O adapter device comprising an offload pipeline for performing on-chip data mirroring and data striping, according to one embodiment of the technology.

FIG. 2 illustrates a system 200 with an I/O adapter device comprising an offload pipeline for performing on-chip data mirroring and data striping, according to one embodiment of the technology. Generally, the host device can offload data processing, e.g., data mirroring and data striping, to the I/O adapter device. An offload pipeline in the I/O adapter device can process the payload data for data mirroring and/or data striping operations. The processed data can then be mirrored to multiple network destinations via a network interface. This may allow improved bandwidth utilization of the host interface and also the memory bandwidth for the host device since the host interface is only used once to transfer the data from the host memory to the I/O adapter device for a transaction.

A system 200 may include an I/O adapter device 202 in communication with the host device 102 and the plurality of network destinations as described in FIG. 1 with reference to the system 100. In some embodiments, the I/O adapter device 202 may be configured to communicate with the host device 102 to process I/O requests for the host device 102. For example, in some instances, the I/O adapter device 202 may be configured to perform network services for the host device 102, e.g., network traffic monitoring, network storage, network processing, etc. Some non-limiting examples of the I/O adapter device 202 may include plug-in modules, expansion cards or any such electronic circuits, e.g., network interface controllers, video cards, sound cards, USB (Universal Serial Bus) devices, Wi-Fi devices, etc.

According to some embodiments of the disclosed technologies, the I/O adapter device 202 may be capable of performing data mirroring and data striping. In some embodiments, an application aware virtual machine executing an application (e.g., a database application) may be aware of some of the capabilities of the I/O adapter device 202 in order to configure the I/O adapter device 202 to perform some of the functionalities on behalf of the virtual machine. For example, in one embodiment, the virtual machine may configure the I/O adapter device 202 to perform data mirroring or data striping by configuring one or more bits in certain registers in the I/O adapter device 202. In some other embodiments, an application agnostic virtual machine executing an application may be agnostic to some of the capabilities of the I/O adapter device 202 and the I/O adapter device 202 may perform some of the functionalities without being configured by the virtual machine. For example, the I/O adapter device 202 may be configured by an external entity or a server.

In some embodiments, the I/O adapter device 202 may be configured as one or more virtual devices, e.g., one or more virtual machines may be running on one or more processor cores on the I/O adapter device 202. According to some embodiments, a virtual machine running on the I/O adapter device 202 may generate an I/O request for a transaction. The I/O adapter device 202 may also be configured to perform data mirroring or data striping on the payload data for the transactions initiated by the virtual machines running on the I/O adapter device 202.

The I/O adapter device 202 may be configured to receive an I/O request for a transaction from a virtual machine. The virtual machine may be running on the host device 102 or on one or more processor cores 104A on the I/O adapter device 202. The I/O request may include payload data for the transaction with or without a header based on the type of the I/O request (e.g., for storage or for network services). For example, in some embodiments, the I/O requests targeted for emulated block storage devices may not include any headers with the payload data. In some embodiments, the I/O requests targeted for emulated network devices (e.g., network interface controllers) may include a header with the payload data. In one embodiment, the headers may include a source address, destination address, type of service, protocol specific information (e.g., Ethernet, wireless, etc.), number of copies or segments, strip width, number of destinations, etc. The I/O adapter device 202 may further be configured to identify the transaction as a type of transaction for transmitting to a plurality of network destinations. In one embodiment, the I/O adapter device 202 may identify the transaction based on certain bits in the header received in the I/O request with the payload data. Further, the I/O adapter device 202 may determine whether data mirroring or data striping can be performed on the payload data based on a source IP address, destination IP address, type of service or other relevant data in the header. For example, the I/O adapter device 202 may identify the transaction as a type of transaction that can be processed to perform data mirroring or data striping on the payload data to generate multiple processed payload data for transmitting to the plurality of network destinations. In one embodiment, the I/O adapter device 202 may determine whether data mirroring or data striping can be performed on the payload data based on one or more bits in a configuration register in the I/O adapter device 202.

In one embodiment, the I/O adapter device 202 may be configured to perform data mirroring by replicating the data into multiple copies for transmitting to multiple network destinations. In one embodiment, the I/O adapter device 202 may be configured to perform data striping by splitting the data into multiple segments for transmitting to multiple network destinations. In some embodiments, each copy or segment of the data may include its own packet header for transmitting to different network destinations. The transmitted data then can be stored in different storage devices at the multiple network destinations. For example, the data may be payload data for a write transaction initiated by the virtual machine 102B running on the host device 102. The write transaction may be initiated by the virtual machine 102B using an I/O request to the I/O adapter device 202. In some instances, the virtual machine 102B may perform a write transaction to a virtual device running on the I/O adapter device 202. For example, the virtual device may be configured to function as a network interface controller that can allow transmitting the data to a server over a network for storing the processed data. In some instances, the virtual device may be emulated as a storage controller for storing data in block storage devices, e.g., hard discs, CD-ROMs or any suitable non-volatile storage device.

In some embodiments, the I/O adapter device 202 may perform data processing to generate multiple processed payload data for transmitting multiple packets (e.g., network packets) to multiple network destinations. Each packet may include a processed payload data with its own packet header. For example, each packet header may include a destination address (e.g., network address), error correction bits, checksum bits, etc. In one embodiment, a first packet may include a first packet header and a first processed payload data and a second packet may include a second packet header and a second processed payload data. For data mirroring, in one embodiment, the first processed payload data may include a first copy of the payload data and the second processed payload data may include a second copy of the payload data. For example, the payload data may be replicated to generate multiple copies of the payload data for transmitting to different network destinations with different packet headers. In another embodiment, the first processed payload data may include the payload data and the second processed payload data may include the payload data. For example, the same payload data may be sent with different packet headers to different network destinations. For data striping, in one embodiment, the first processed payload data may include a first segment (or part) of the payload data and the second processed payload data may include a second segment of the payload data. For example, the payload data may be split to generate multiple segments (or parts) of the payload data for transmitting to different network destinations with different packet headers.

In one embodiment, the host device 102 may be configured to determine some of the capabilities (e.g., data mirroring, data striping, etc.) of the I/O adapter device 202. For example, in some instances, the host device 102 may communicate with the I/O adapter device 202 via the host interface 108 to determine the functionalities supported by the I/O adapter device 202. In some embodiments, the host device 102 may configure the I/O adapter device 202 to offload some of the functionalities supported by the virtual machine 102B to the I/O adapter device 102. For example, in some instances, the virtual machine 102B may support data mirroring and data striping functionalities. In some instances, each virtual machine running on the host device 102 may include an identifier that can be used to determine the functionalities supported by each virtual machine. According to some embodiments, the host device 102 may reconfigure the virtual machine 102B to make the virtual machine 102B aware of the some of the functionalities supported by the I/O adapter device 202, e.g., data mirroring and data striping, in order for the host device 102 to offload those functionalities to be performed by the I/O adapter device 202.

In some embodiments, the I/O adapter device 202 may include one or more queues (not shown) that may be designated for handling I/O requests from the virtual machines. In one embodiment, one or more queues may be assigned to each of the processor cores 104A for handling I/O requests from each virtual machine. In some embodiments, one or more processor cores 104A may be configured to handle specific tasks and one or more queues may be assigned to each of those processor cores 104A for handling specific type of I/O requests from specific virtual machines.

The I/O adapter device 202 may include a management subsystem 204 and an offload pipeline 206 in addition to the processor cores 104A, memory 104B and the network interface 104C as discussed with reference to the I/O adapter device 104 in FIG. 1. The management subsystem 204, offload pipeline 206, network interface 104C and the processor cores 104A may be configured to communicate with one another using an interconnect 208. For example, the interconnect 208 may include busses, mesh, matrix, fabric or any suitable implementation to allow various components of the I/O adapter device 202 to communicate with one another. It will be understood that the I/O adapter device 202 may include more or less components than shown in FIG. 2. For example, the I/O adapter device 202 may also include one or more memory controllers, I/O controllers, etc.

In one embodiment, the management subsystem 204 may be configured to configure and manage the offload pipeline 206. In one embodiment, the management subsystem 204 may communicate with the host processor 102A about some of capabilities of the I/O adapter device 202 in order for the host processor 102A to offload some of the functionalities to be performed by the I/O adapter device 202. For example, in one embodiment, if the virtual machine 102B running on the host device can support data mirroring and data striping operations, the virtual machine 102B can be reconfigured (e.g., using an Application Programming Interface) to make it aware of the some of the functionalities supported by the I/O adapter device 202, e.g., data mirroring and data striping, in order for the host device 102 to offload those functionalities to be performed by the I/O adapter device 202. In some embodiments, the management subsystem 204 may be configured to determine different network destinations for transmitting the processed data by the I/O adapter device 202. For example, the management subsystem 204 may determine different network destinations based on the identifier associated with each virtual machine 102B. For example, in one embodiment, the network destinations may be predetermined for the virtual machine 102B for transmitting the processed data, e.g., at power up or when the virtual machine 102B is created. In some embodiments, different network destinations may be determined based on one or more bits in the header included in the I/O request along with the payload data.

In some embodiments, the I/O adapter device 202 may perform certain functionalities without being configured by a virtual machine. For example, in some instances, a virtual machine may not support certain functionalities, e.g., data mirroring and data striping. The virtual machine may be running on the host device 102 or on the I/O adapter device 202. In one embodiment, the I/O adapter device 202 may be configured by an external entity or a server to perform some of functionalities for the virtual machine. For example, in one embodiment, the management subsystem 204 may determine that the virtual machine does not support data mirroring or data striping (e.g., based on the virtual machine identifier) functionalities and may enable the offload pipeline 206 to perform appropriate data mirroring and/or data striping for the virtual machine without being configured by the virtual machine, e.g., the virtual machine may be agnostic to the data mirroring and/or data striping performed by the offload pipeline 206. For example, the virtual machine 102B may send an I/O request to the I/O adapter device 202 for a write transaction to a storage location. The I/O adapter device 202 may perform the write transaction to that storage location and also replicate the data or split the data for the write transaction "under the hood" for transmitting to multiple network locations. This may allow faster recovery of the data in the event of a failure due to data corruption or when one of the network locations is down. In the instances, the virtual machine 102B is agnostic to the data mirroring and data striping capabilities of the I/O adapter device 202, the network destinations for transmitting the replicated data or segments of the data may be determined by the I/O adapter device 202. For example, in one embodiment, the network destinations for transmitting the processed data may be determined based on the protocols supported by the virtual machine, e.g., based on the header in the I/O request. In another embodiment, the network destinations for transmitting the processed data may be provided by an external entity or a server.

The offload pipeline 206 may include a plurality of components that may be configured to receive and process I/O requests for the host device 102, e.g., virtual machine 102B running on the host device 102, or I/O requests from the virtual machines running on the I/O adapter device 202. The offload pipeline 206 may be configured to identify the transaction as a type of transaction for transmitting to a plurality of network destinations. For example, the offload pipeline 206 may be configured to fetch payload data associated with an I/O request from a memory and encode the payload data (e.g., perform data compression and/or data encryption). The offload pipeline 206 may further process the payload data (e.g., perform data mirroring and/or data striping) for transmitting to different network destinations via the networks 110. In one embodiment, the encoded data may be stored in an on-chip memory before processing the payload data. An exemplary block diagram of the offload pipeline 206 is discussed with reference to FIG. 3.

Figure 3:
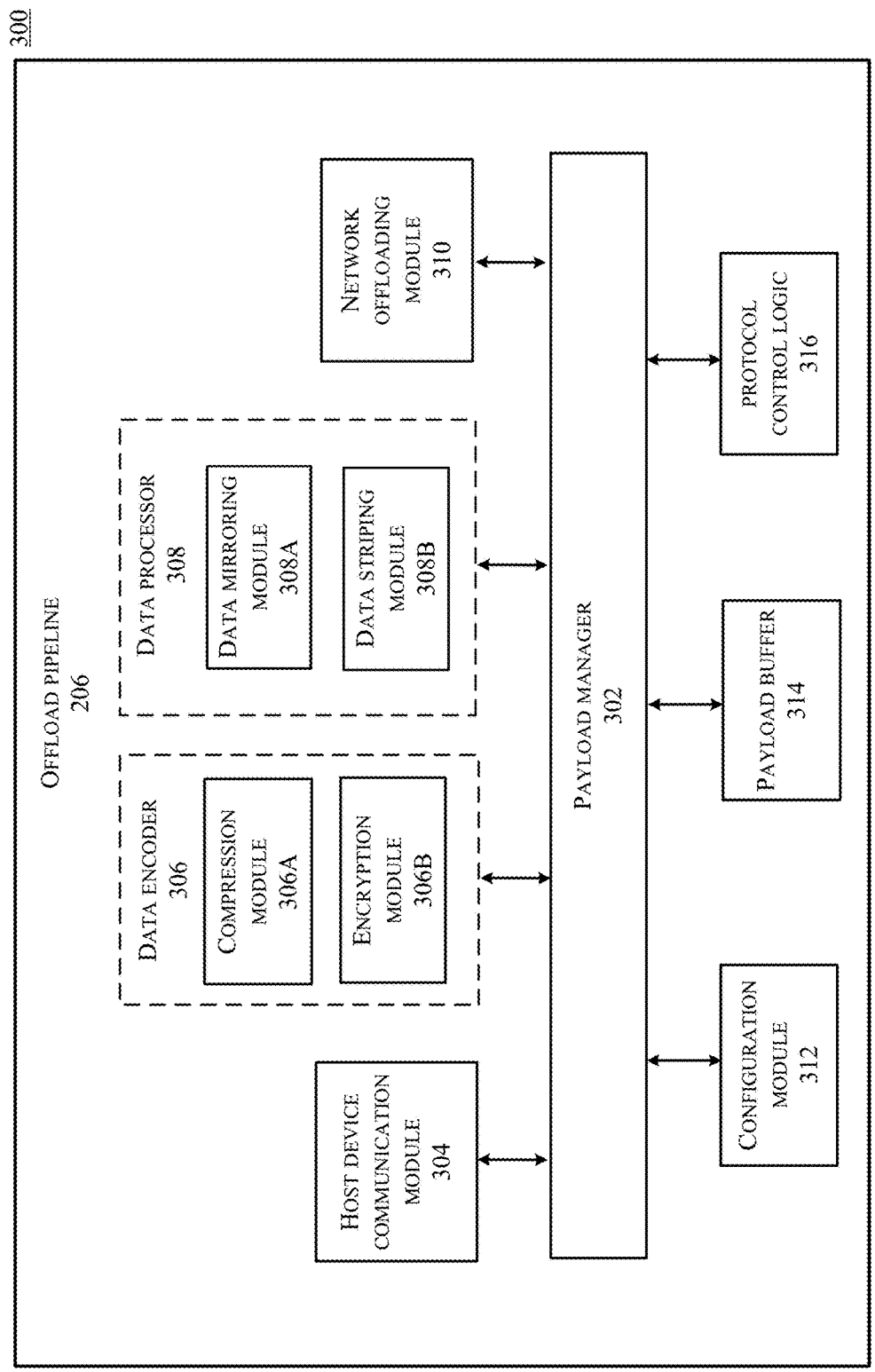
FIG. 3 illustrates components of an offload pipeline in accordance with one embodiment of the disclosed technology.

FIG. 3 illustrates components of an offload pipeline in accordance with one embodiment of the disclosed technology.

The offload pipeline 206 may include a payload manager 302, a host device communication module 304, a data encoder 306, a data processor 308, a network offloading module 310, a configuration module 312, a payload buffer 314 and a protocol control logic 316.

The host device communication module 304 may be configured to communicate with the host device 102. In one embodiment, the host device communication module 304 may include a PCIe bus interface to communicate with the host device 102 based on a PCIe protocol. For example, the host device communication module 304 may include a PCIe controller that may be configured to communicate with another PCIe controller on the host device 102 over a PCIe interface, e.g., the host interface 108. The I/O adapter device 202 may receive I/O requests from the host device 102 through the host device communication module 304. For example, the I/O requests may include requests for storage or network services such as block storage, network storage, network processing, network traffic monitoring, etc. In some embodiments, the host device communication module 304 may be used to fetch payload data from the host memory 106 for an I/O request for a transaction. The I/O adapter device 202 may fetch the payload data that may be stored in the host memory 106 using the host interface 108. For example, the host device communication module 304 may communicate with the host processor 102A via the host interface 108. The host processor 102A, in turn, may read the payload data from the host memory 106 and may provide the payload data to the host device communication module 304 via the host interface 108. In some embodiments, the host device communication module 304 may include one or more queues for handling I/O requests from the virtual machines. For example, in one embodiment, one or more queues may be assigned to each of the processor cores 104A for handling specific type of I/O requests from specific virtual machines. In some embodiments, the host device communication module 304 may be used to identify whether a transaction for an I/O request is a type of transaction for transmitting to the plurality of network destinations based on one or more bits in the header received with the payload data for that transaction. For example, the header may include information about a source address, destination addresses, type of service (e.g., storage or network service), etc., that can be used by a decoder in the host device communication module 304 for determining whether data mirroring or data striping can be performed to generate plurality of processed payload data for transmitting to the plurality of network destinations.

The configuration module 312 may include one or more configuration registers that can be used to configure the I/O adapter device 202. In some embodiments, the one or more configuration registers can be accessed by the host device 102, an external entity or a server or by BIOS software. In one embodiment, the host device 102 may access certain bits of the configuration register to determine some of the capabilities of the I/O adapter device, e.g., data mirroring, data striping, etc. In one embodiment, the host device 102 may configure certain bits in the configuration register to indicate that a certain virtual machine (e.g., using virtual machine identifier) running on the host device 102 does not support data mirroring and/or data striping functionalities. This information may be used by the I/O adapter device 202 to determine if the I/O adapter device 202 can perform data mirroring and/or data striping functionalities "under the hood" without being configured by the virtual machine. In some embodiments, a virtual machine can configure the I/O adapter device 202 for processing the payload data for transmitting to the multiple network destinations by configuring certain bits in the configuration register. For example, in some embodiments, one or more bits in the configuration register may be used to determine if the data mirroring, data striping, or both data mirroring and data striping has to be performed by the I/O adapter device 202. For example, if the virtual machine is running on the I/O adapter device 202, the configuration register may be configured to identify the type of data processing that can be performed on the payload data.

The data encoder 306 may be configured to encode the payload data before processing the payload data for transmitting to multiple network destinations. For example, in some embodiments, the payload data may be compressed to reduce the amount of data for storage and communication over a network. Further, the payload data may be encrypted for secure transmission over the one or more networks 110. In some embodiments, the encoded data may be stored in an on-chip memory (e.g., payload buffer 314) before processing the payload data. In some embodiments, the data encoder 306 may include a compression module 306A to perform compression and an encryption module 306B to perform encryption of the payload data. The compression module 306A may use any known compression algorithms, e.g., JPEG, MPEG, Huffman coding, LZW, etc. to compress the payload data. The encryption module 306B may use any known data encryption algorithms to encrypt the payload data, e.g., data encryption standard (DES), RCS, advanced encryption standard (AES), Blowfish, etc. In one embodiment, encryption keys for encrypting the payload data may be provided by the protocol control logic 316 based on the network protocol used for transmitting the data. In some embodiments, the payload data received from the host memory 106 via the host interface 108 may already be compressed and/or encrypted and may undergo decompression and/or decryption before going through the compression module 306A and the encryption module 306B for transmission over the network and for storage into multiple network destinations. Further, in some embodiments, only compression, only encryption, or both compression and encryption may be performed on the payload data.

The data processor 308 may be configured to perform data mirroring, data striping or any suitable data processing to process the payload data for transmitting to multiple network destinations for storage. The data processor 308 may be configured to process the payload data to generate multiple processed payload data, e.g., a first processed payload data, a second processed payload data, etc. for transmitting to the multiple network destinations. For example, the first processed payload data and a first packet header may be transmitted in a first packet to the first network destination 112, the second processed payload data and a second packet header may be transmitted in a second packet to the second network destination 114 and so on. In one embodiment, the payload data may be transmitted as the first processed payload data and the second processed payload data. For example, the payload data may be the encoded payload data that has been compressed and/or encrypted. In some embodiments, the data processor 308 may include a data mirroring module 308A and a data striping module 308B.

The data mirroring module 308A may be configured to perform data mirroring on the payload data based on a mirroring configuration. For example, the mirroring configuration may include number of copies, number of destinations, types of destinations, etc. The data mirroring module 308A may be configured to replicate the payload data into multiple copies for transmitting to the multiple network destinations. For example, the first processed data may be a first copy of the payload data and the second processed data may be a second copy of the payload data. For example, the payload data may be transmitted with different packet headers to different network destinations or may be stored in the payload buffer 314 to generate multiple copies for transmitting to different destinations. In some embodiments, the data mirroring module 308A may replicate the payload data that has already been compressed and/or encrypted by the data encoder 306, which can result in better utilization of the processing and memory resources as compared to compressing and/or encrypting each copy of the payload data individually before transmitting to a network destination. In one embodiment, the mirroring configuration may be provided by the application aware virtual machines in the header with the payload data. In another embodiment, the mirroring configuration may be determined by the I/O adapter device 202 for application agnostic virtual machines. For example, in some embodiments, the mirroring configuration may be determined based on the protocols or functionalities supported by the virtual machine as determined from one or more bits in the header. In some embodiments, the mirroring configuration may be provided by an external entity or server. In one embodiment, the payload data may be mirrored across all the queues that may be configured to handle the I/O requests between the I/O adapter device 202 and the host device 102. In another embodiment, the payload data may be mirrored across certain specific queues that may be configured to handle specific I/O requests between the I/O adapter device 202 and the host device 102. In some embodiments, the number of copies of the payload data for transmitting to the multiple network destinations may be managed by the payload manager 302 in communication with the protocol control logic 316.

The data striping module 308B may be configured to perform data striping on the payload data based on a striping configuration. For example, the striping configuration may include number of segments (also called stripes, strip units, strides, etc.), strip width, number of destinations, types of destinations, etc. The data striping module 308B may be configured to split the payload data into multiple segments or parts for efficient storage and faster retrieval of the payload data. For example, the first processed data may be a first segment of the payload data and the second processed data may be a second segment of the payload data. For example, different segments of the payload data may be transmitted with different packet headers to different network destinations or may be stored in the payload buffer 314 for transmitting to different destinations. In some embodiments, the data striping module 308B may split the payload data that has already been compressed and/or encrypted by the data encoder 306, which may result in better utilization of processing and memory resources as compared to compressing and/or encrypting each segment of the payload data independently before transmitting to a network destination. In one embodiment, the payload data may be split into logically sequential segments for storing the consecutive segments in different storage devices that may be coupled to the same server node on a network. In some embodiments, error correction bits (e.g. parity bits) may also be stored to help retrieve the data in case of data corruption (e.g., failure of a storage device). In one embodiment, the striping configuration may be provided by the application aware virtual machines in the header with the payload data. In another embodiment, the striping configuration may be determined by the I/O adapter device 202 for application agnostic virtual machines. For example, in some embodiments, the striping configuration may be determined based on the protocols or functionalities supported by the virtual machine as determined from one or more bits in the header. In some embodiments, the striping configuration may be provided by an external entity or server. In one embodiment, the payload data may be split across all the queues that may be configured to handle the I/O requests between the I/O adapter device 202 and the host device 102. In another embodiment, the payload data may be split across certain specific queues that may be configured to handle specific I/O requests between the I/O adapter device 202 and the host device 102. In some embodiments, the number of segments of the payload data for transmitting to the multiple network destinations may be managed by the payload manager 302 in communication with the protocol control logic 316.

The protocol control logic 316 may include control logic to support different protocols, e.g., Internet Protocol, Ethernet, Wi-Fi, TCP, UDP, ATM, Fiber channel, Remote Direct Memory Access (RDMA), etc., used for transmission of the data over the one or more networks 110. For example, in some embodiments, different virtual machines may utilize different network protocols for transmitting and/or storing copies of the payload data or segments of the payload data over the networks 110. Thus, the I/O adapter device 202 may support different protocols for communicating with different networks. In one embodiment, the virtual machine executing an application may be aware of the data mirroring and data striping capabilities of the I/O adapter device 202 and may communicate with the I/O adapter device 202 any information related to the network destinations where the processed payload data (e.g., copies or segments of the payload data) can be stored. For example, information related to the network destinations for transmitting and/or storing the processed payload data may be provided with that particular I/O request, as part of a mirroring or striping configuration, at boot time or using any suitable mechanism. In some embodiments, the protocol control logic 316 may determine the network destinations based on the value of certain bits in the configuration registers in the configuration module 312. In one embodiment, the protocol control logic 316 may determine the network destinations for transmitting and/or storing the processed payload data based on the protocols supported by the virtual machine. For example, in one embodiment, the processed payload data being transferred in a first packet via the one or more networks 110 using Fiber Channel may be transmitted to the first network destination 112 and the processed payload data being transferred in a second packet using the Ethernet may be transmitted to the second network destination 114. In some embodiments, the network destinations may be selected based on the typed of processed data (e.g., mirrored or segmented), compression method or the encryption method used on the payload data. In one embodiment, the network destinations for transmitting and/or storing the processed payload data may be provided by an external entity or server. In some embodiments, number of copies or segments of the payload data, network destinations for transmitting each copy or segment of the payload data, encryption key for encrypting the payload data and any other relevant information may be provided by the protocol control logic 316, e.g., via the payload manager 302.

The payload buffer 314 may include an on-chip memory to store the data. In some embodiments, the payload buffer 314 may include a memory that can provide fast access time for writing and reading the payload data, e.g., an SRAM (Static Random Access Memory). In some embodiments, storing and retrieving the payload data from the payload buffer 314 may be managed by the payload manager 302. In one embodiment, the payload buffer 314 may be configured to store the encoded payload data as a result of the data compression and/or encryption before the payload data is processed by the data processor 308. In some embodiments, the payload buffer 314 may be configured to store multiple segments of the payload data as a result of the data striping. In some embodiments, the payload buffer 314 may store different payload data for multiple virtual machines running on the host device 102 simultaneously.

The payload manager 302 may be configured to manage storing and retrieving the payload data from the payload buffer 314. In some embodiments, the payload manager 302 may be configured to manage the payload data based on the mirroring or striping configuration. For example, in one embodiment, the payload manager 302 may be configured to receive the compressed/encrypted payload data from the data encoder 306 and to store the compressed/encrypted payload data into the payload buffer 314. The payload manager 302 may also be configured to read the compressed/encrypted payload data from the payload buffer 314 and to provide it to the data processor 308 for data mirroring or data striping. The payload manager 302 may also be configured to store multiple segments of the payload data in the payload buffer 314 as a result of the data striping performed by the data striping module 308B. In one embodiment, the payload manager 302 may also be configured to communicate with the protocol control logic to determine the network destinations for transmitting the processed payload data, e.g., based on whether the virtual machine requesting the I/O transaction is aware of or agnostic to the data processing performed by the offload pipeline 206. For example, in some embodiments, the payload manager 302 may communicate with the management subsystem 204 to determine if the data mirroring and/or data striping operations need to be performed on a particular payload data. In some embodiments, the payload manager 302 may communicate with the communication module 312 to determine if the data mirroring or data striping or both data mirroring and data striping need to be performed on the data based on the certain bits in the configuration registers.

The network offloading module 310 may be configured to prepare the processed payload data for transmitting to the multiple network destinations via the one or more networks 110. In some embodiments, each processed payload data may be transmitted with its own packet header to a network destination. In one embodiment, the network offloading module 310 may generate a packet to include a packet header with a copy or segment of the processed payload data for transmitting over the networks 110. For example, a first packet may include a first packet header with a first processed payload data and a second packet may include a second packet header with a second processed payload data. In one embodiment, each packet header may include network protocol information (e.g., TCP/IP, UDP, etc.), destination address, source address and any other relevant data. The first processed payload data may be the payload data or a first copy of the payload data as a result of the data mirroring, or a first segment of the payload data as a result of the data striping. The second processed payload data may be the payload data or a second copy of the payload data as a result of the data mirroring, or a second segment of the payload data as a result of the data striping. In one embodiment, the network offloading module 310 may also include an error correction value such as a CRC (Cyclic Redundancy Check) or a checksum in the header based on the network protocol (e.g., Ethernet CRC, UDP/IP checksum, etc.) for transmitting over the networks 110. Referring back to FIG. 2, the network offloading module 310 may communicate with the network interface 104C for offloading the processed payload data to multiple network destinations via the one or more networks 110. In some embodiments, the network destinations for transmitting the multiple processed payload data may be predetermined for the virtual machines that are aware of the data mirroring and data striping capabilities of the I/O adapter device 202, e.g., at power up or when the virtual machine is created. In some embodiments, the network destinations for transmitting the multiple processed payload data may be determined by the I/O adapter device 202 for the virtual machines that are agnostic to the data mirroring and data striping capabilities of the I/O adapter device 202. In some embodiments, the network destinations for transmitting the multiple processed payload data may be determined based on the mirroring or striping configuration.

Figure 4:
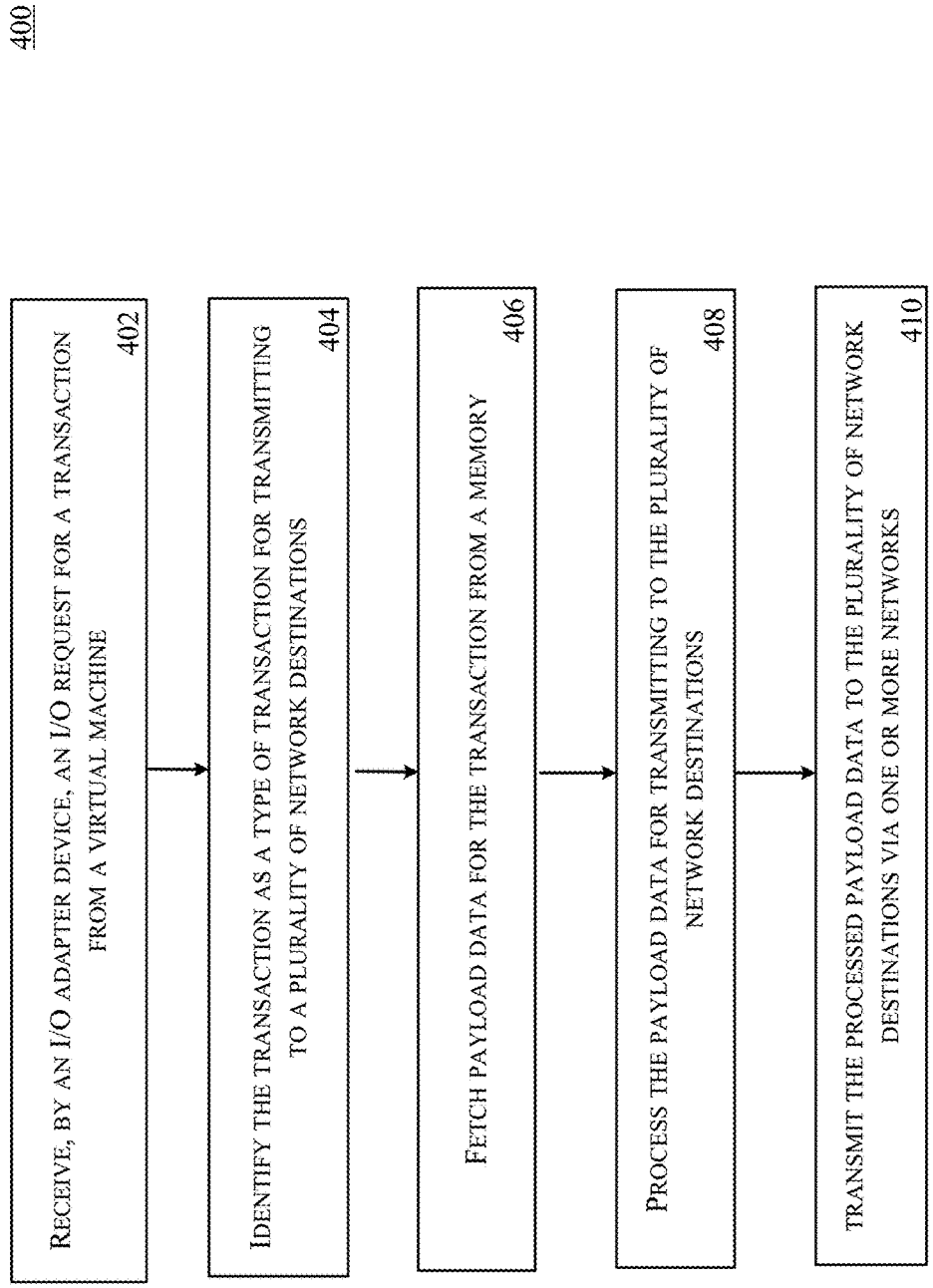
FIG. 4 illustrates an exemplary method for processing the payload data, according to some embodiments of the disclosed technology.

FIG. 4 illustrates an exemplary method 400 for processing the payload data for sending to multiple network destinations, according to some embodiments of the technology.

In step 402, an I/O adapter device receives an I/O request for a transaction from a virtual machine. For example, referring back to FIG. 2, the I/O adapter device 202 may receive an I/O request for the transaction from the virtual machine 102B running on the host device 102 or a virtual machine running on the I/O adapter device 202. For example, the virtual machine may be running a database application such as Oracle®, MongoDB®, etc. The virtual machine may be an application aware virtual machine (e.g., aware of the capabilities of the I/O adapter device 202) or an application agnostic virtual machine (e.g., agnostic to the capabilities of the I/O adapter device 202). In some embodiments, the I/O adapter device 202 may receive the I/O request from the host device 102 via the host interface 108. For example, the host interface 108 may be a PCIe interface. In some embodiments, the host device 102 may include a first PCIe controller (not shown) that may be configured to send the I/O request via the host interface 108 to a second PCIe controller in the I/O adapter device 202. For example, the second PCIe controller (not shown) may be part of the host device communication module 304.

In step 404, the I/O adapter device identifies the transaction as a type of transaction for transmitting to a plurality of network destinations. Referring back to FIG. 2, the I/O adapter device 202 may identify that the transaction is a type of transaction for transmitting to the first network destination 112, second network destination 114 and the Nth network destination 116. For example, the virtual machine may send an I/O request to the I/O adapter device 202 for network services or for writing to a storage device or to a peripheral that may be coupled to the I/O adapter device 202. In some embodiments, the I/O request may be for a virtual device on the I/O adapter device 202 to perform the transaction. For example, the virtual device may emulate an NVMe controller, SATA controller, an Ethernet controller, a NIC, a USB device or any suitable device for transmitting or storing the mirrored or split data to the multiple network destinations. In one embodiment, the I/O adapter device 202 may identify the transaction based on one or more bits in the header included in the I/O request along with the payload data. In another embodiment, the I/O adapter device 202 may identify the transaction based on one or more bits in the configuration register in the configuration module 312. For example, the configuration register may be configured by the virtual machine, the host device 102, or by an external entity or server.

In step 406, the I/O adapter device fetches payload data for the transaction from a memory. Referring back to FIG. 2, if the I/O request is from the virtual machine 102B running on the host device, the payload data for the transaction may be stored in the host memory 106. The I/O adapter device 202 may fetch the payload data from the host memory 106 via the host interface 108. If the I/O request is from a virtual machine running on one or more processor cores 104A, the payload data may be stored in the memory 104B or the payload buffer 314.

In step 408, the I/O adapter device processes the payload data for transmitting to the plurality of network destinations. For example, in one embodiment, the I/O adapter device 202 may determine the type of data processing, e.g., data mirroring and/or data striping, based on certain bits in the configuration registers as discussed with reference to the configuration module 312 in FIG. 3. In another embodiment, the I/O adapter device 202 may determine the type of data processing, e.g., data mirroring and/or data striping, based on certain bits in the header as part of the I/O request. In some embodiments, whether data mirroring or data striping can be performed across all the queues or certain specific queues may be determined based on the mirroring or striping configuration as discussed with reference to FIG. 3. The I/O adapter device 202 may perform data mirroring and/or data striping on the payload data for transmitting to the plurality of network destinations, e.g., the first network destination 112, second network destination 114, Nth network destination 116 and so on. In some embodiments, the I/O adapter device 202 may be pre-configured by the host device 102 to perform data mirroring and/or data striping on the payload data, e.g., for an application aware virtual machine. In some embodiments, the I/O adapter device 202 may be configured by an external entity or a server to perform data mirroring and/or data striping on the payload data, e.g., for an application agnostic virtual machine. In some other embodiments, the I/O adapter device 202 may perform data mirroring and/or data striping "under the hood" or without being configured the virtual machine. The payload manager 302 may retrieve the payload data from the payload buffer 314 and forward it to the data processor 308 for data mirroring and/or data striping operations. The data mirroring module 308A or the data striping module 308B may process the data accordingly for transmitting to the plurality of network destinations. For example, the data mirroring module 308A or the data striping module 308B may generate a first processed payload data, a second processed payload data and so on. The first processed payload data may be the payload data itself, a first copy of the payload data or a first segment of the payload data. The second processed payload data may be the payload data itself, a second copy of the payload data or a second segment of the payload data. The plurality of network destinations may be determined at power-up, may be provided by the virtual machine 102B with the I/O request, may be provided in the corresponding mirroring or striping configuration or may be provided by an external entity or a server. In some embodiments, the plurality of network destinations may be determined by the protocol control logic 316 from the headers based on the protocol or functionalities supported by the virtual machine 102B, e.g., if the virtual machine 102B is agnostic to the data mirroring and data striping capabilities of the I/O adapter device 202.

In step 410, the I/O adapter device transmits the processed payload data to the plurality of network destinations via one or more networks. Referring back to FIG. 2, the I/O adapter device 202 may transmit the multiple copies or the multiple segments of the payload data to the plurality of network destinations via the one or more networks 110. For example, the I/O adapter device 202 may transmit the first processed payload data with a first packet header in a first packet to the first network destination 112 and transmit the second processed payload data with a second packet header in a second packet to the second network destination 114. For example, the network offloading module 310 may prepare different packets including multiple copies or the multiple segments of the payload data with the appropriate headers including optional error correction bits and offload them for transmitting to various network destinations. The transmitted data may be stored at different storage devices at the various network destinations, e.g., the first network destination 112, second network destination 114, and so on.

Figure 5:
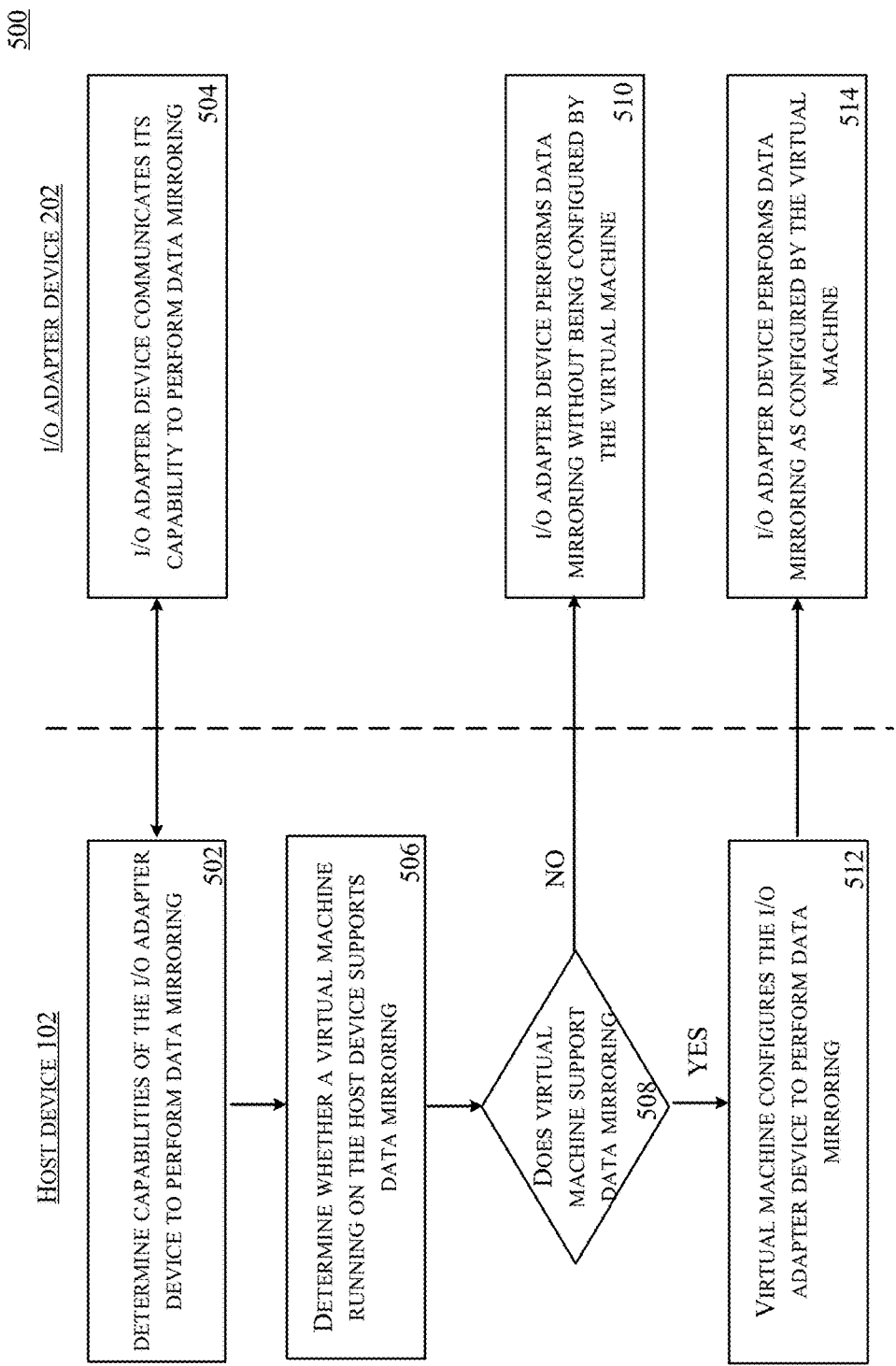
FIG. 5 illustrates an exemplary method for performing data mirroring, according to one embodiment of the disclosed technology.

FIG. 5 illustrates an exemplary method for performing data mirroring in one embodiment of the disclosed technology. A method 500 illustrates communication between the host device 102 and the I/O adapter device 202 for offloading data mirroring to be performed by the I/O adapter device 202.

In step 502, the host device 102 may determine some of capabilities of the I/O adapter device 202. For example, the host device 102 may determine the capability of the I/O adapter device 202 to perform data mirroring. In some embodiments, the host device 102 may determine some of capabilities of the I/O adapter device 202 by reading certain bits in the configuration register in the I/O adapter device 202 as discussed with reference to FIG. 3. In some embodiments, the host device 102 may host one or more virtual machines configured to execute one or more applications on the host device 102. For example, the application may be a database application that may include writing payload data to a network destination (e.g., remote storage devices). In one embodiment, the virtual machine may be running on the one or more processor cores 104A on the I/O adapter device 202. For example, the virtual machine may be running an application to emulate a NIC for providing network services by the I/O adapter device 202. In one embodiment, the application may support data mirroring and/or data striping functionalities. For example, the application may be capable to generate multiple copies or multiple segments of the payload data for transmitting to the multiple network destinations. In another embodiment, the application may not support data mirroring and/or data striping functionalities. For example, the application may send an I/O request including a transaction to the I/O adapter device 202 for performing just a write to a local memory or to a remote memory via a network.

In step 504, the I/O adapter device 202 may communicate some of its capabilities to the host device 102. For example, in some embodiments, the I/O adapter device 202 may communicate its capability to perform data mirroring to the host device 102 via the host interface 108. In one embodiment, the management subsystem 204 may communicate some of the capabilities of the I/O adapter device 202 based on the value of the configuration registers at power up or boot time.

In step 506, the host device 102 may determine if a virtual machine running on the host device 102 supports data mirroring functionality. In some embodiments, the virtual machine 102B may support the data mirroring functionality to replicate the payload data to generate multiple copies of the payload data for transmitting to multiple network destinations. In some embodiments, the virtual machine 102B may support the data mirroring functionality by transmitting the payload data with a different header to different network destinations. For example, the virtual machine 102B may support data mirroring to store multiple copies of the data in various storage device at different network destinations for increasing the availability of the data in the event of a failure or to decrease response time.

In step 508, the host device 102 may communicate to the I/O adapter device 202 that the virtual machine 102B does not support the data mirroring functionality. In some embodiments, the host device 102 can configure certain bits in the one or more configuration registers in the I/O adapter device 202 to indicate whether the virtual machine 102B supports the data mirroring functionality or not. In some embodiments, the virtual machine 102B may configure one or more bits in a header to identify whether the virtual machine supports data mirroring for sending to the I/O adapter device 202 with the payload data for a transaction.

In step 510, the I/O adapter device 202 can perform data mirroring without being configured by the virtual machine, if the virtual machine 102B does not support the data mirroring functionality. For example, the I/O adapter device 202 may determine, based on the certain bits in the configuration register that have been configured by the host device 102, that the virtual machine 102B does not support the data mirroring functionality. The virtual machine 102B may send an I/O request to the I/O adapter device 202 for a transaction and may not be aware of the data mirroring performed by the I/O adapter device 202. The I/O adapter device 202 can perform data mirroring for fault tolerance and speedy recovery of the data if the data is corrupted in one storage location. As discussed with reference to steps 406-408 in FIG. 4, the I/O adapter device 202 may fetch the data from the host memory 106, and perform data mirroring to generate a first processed payload data and a second processed payload data. In some embodiments, the I/O adapter device 202 may perform compression and encryption of the data before processing the data as discussed in FIG. 3 with reference to offload pipeline 206. Further, as discussed with reference to FIG. 3, the data mirroring module 308A may perform data mirroring by generating multiple processed payload data for transmitting to multiple network destinations. In one embodiment, the multiple network destinations may be determined by the protocol control logic 316 or be provided by an external entity or server. For example, two or more network destinations from the plurality of network destinations (e.g., the first network destination 112, second network destination 114 and so on) can be determined for transmitting the replicated data. Further, as discussed with reference to FIG. 3, the network offloading module 310 may prepare the processed data for transmitting to the network destinations via the one or more networks 110 using the network interface 104C.

In step 512, the host device 102 can configure the I/O adapter device 202 to perform data mirroring if the virtual machine supports the data mirroring functionality. For example, in one embodiment, the I/O adapter device 202 (e.g., a virtual device running on the I/O adapter device 202) can be configured to perform data mirroring on behalf of the virtual machine. For example, the data mirroring capability of the I/O adapter device 202 can be integrated with the virtual machine using an Application Programming Interface. In one embodiment, certain bits in the one or more configuration registers in the configuration module 312 can be configured to indicate that the I/O adapter device 202 can perform data mirroring on behalf of the virtual machine 102B, i.e., the data mirroring functionality can be offloaded to the I/O adapter device 202. This can allow better utilization of the memory and compute resources of the host device 102 since the payload data can be fetched once from the host memory and can be stored in the payload buffer 314 on the I/O adapter device 202 or can be processed directly for transmitting to the appropriate network destinations.

In step 514, the I/O adapter device 202 can perform data mirroring as configured by the virtual machine. As discussed with reference to steps 406-408 in FIG. 4, the I/O adapter device 202 may fetch the data from the host memory 106 and can perform data mirroring. In some embodiments, the virtual machine may be running on the one or more processor cores 104A and the payload data may be fetched from the memory 104B. In some embodiments, the I/O adapter device 202 may perform compression and encryption of the data before processing the data as discussed in FIG. 3 with reference to offload pipeline 206. Further, as discussed with reference to FIG. 3, the data mirroring module 308A may perform data mirroring by processing the payload data to generate multiple processed payload data for transmitting to multiple network destinations. The multiple network destinations may be predetermined where the data may be transmitted. In one embodiment, the network destinations may be predetermined for the virtual machine for transmitting and/or storing the processed data, e.g., at power up or when the virtual machine is created. In one embodiment, the network destinations for the virtual machine may be determined based on an identifier associated with the virtual machine. In one embodiment, the network destinations and the number of copies may be determined from the appropriate mirroring or striping configuration. Further, as discussed with reference to FIG. 3, the network offloading module 310 may prepare the processed data for transmitting to the predetermined destinations via the one or more networks 110 using the network interface 104C.

Figure 6:
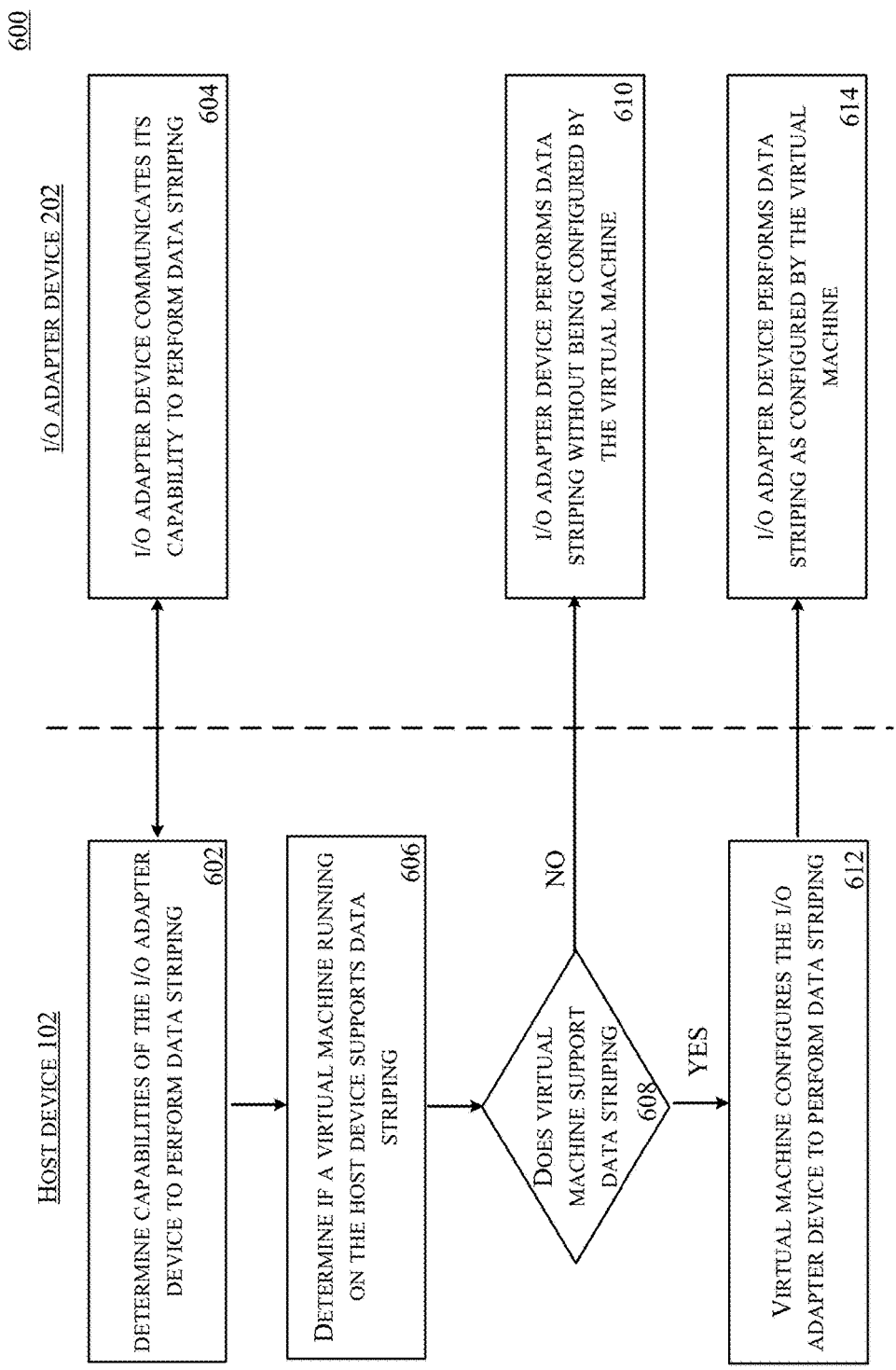
FIG. 6 illustrates an exemplary method for performing data striping, according to one embodiment of the disclosed technology.

FIG. 6 illustrates an exemplary method for performing data striping in one embodiment of the disclosed technology. A method 600 illustrates communication between the host device 102 and the I/O adapter device 202 for offloading data striping to be performed by the I/O adapter device 202.

In step 602, the host device 102 may determine some of capabilities of the I/O adapter device 202. For example, the host device 102 may determine the capability of the I/O adapter device 202 to perform data striping. In some embodiments, the host device 102 may determine some of capabilities of the I/O adapter device 202 by reading certain bits in the configuration register in the I/O adapter device 202 as discussed with reference to FIG. 3. In some embodiments, the host device 102 may host one or more virtual machines configured to execute one or more applications on the host device 102. For example, the application may be a database application that may include writing payload data to a network destination (e.g., remote storage devices). In one embodiment, the virtual machine may be running on the one or more processor cores 104A on the I/O adapter device 202. For example, the virtual machine may be running an application to emulate a NIC for providing network services by the I/O adapter device 202. In one embodiment, the application may support data mirroring and/or data striping functionalities. For example, the application may be capable to generate multiple copies or multiple segments of the payload data for transmitting to the multiple network destinations. In another embodiment, the application may not support data mirroring and/or data striping functionalities. For example, the application may send an I/O request including a transaction to the I/O adapter device 202 for performing just a write to a local memory or to a remote memory via a network.

In step 604, the I/O adapter device 202 may communicate some of its capabilities to the host device 102. For example, in some embodiments, the I/O adapter device 202 may communicate its capability to perform data striping to the host device 102 via the host interface 108. In one embodiment, the management subsystem 204 may communicate some of the capabilities of the I/O adapter device 202 based on the value of the configuration registers at power up or boot time.

In step 606, the host device 102 may determine if a virtual machine running on the host device 102 supports data striping functionality. In some embodiments, the virtual machine 102B may support the data striping functionality to split the payload data to generate multiple segments of the payload data for transmitting to multiple network destinations. In some embodiments, the virtual machine 102B may support the data striping functionality by transmitting different segments of the payload data with different headers to different network destinations. For example, the virtual machine 102B may support data striping to store multiple segments of the data in various storage devices at different network destinations for increasing the availability of the data in the event of a failure or to decrease response time.

In step 608, the host device 102 may communicate to the I/O adapter device 202 that the virtual machine 102B does not support the data striping functionality. In some embodiments, the host device 102 can configure certain bits in the one or more configuration registers in the I/O adapter device 202 to indicate whether the virtual machine 102B supports the data striping functionality or not. In some embodiments, the virtual machine 102B may configure one or more bits in a header to identify whether the virtual machine supports data striping for sending to the I/O adapter device 202 with the payload data for a transaction.

In step 610, the I/O adapter device 202 can perform data striping without being configured by the virtual machine, if the virtual machine 102B does not support the data striping functionality. For example, the I/O adapter device 202 may determine, based on the certain bits in the configuration register that have been configured by the host device 102, that the virtual machine 102B does not support the data striping functionality. The virtual machine 102B may send an I/O request to the I/O adapter device 202 for a transaction and may not be aware of the data striping performed by the I/O adapter device 202. The I/O adapter device 202 can perform data striping for fault tolerance and speedy recovery of the data if the data is corrupted in one storage location. As discussed with reference to steps 406-408 in FIG. 4, the I/O adapter device 202 may fetch the data from the host memory 106, and split the data to perform data striping. In some embodiments, the I/O adapter device 202 may perform compression and encryption of the data before splitting the data as discussed in FIG. 3 with reference to offload pipeline 206. Further, as discussed with reference to FIG. 3, the data striping module 308B may perform data striping by splitting the data into multiple segments to generate multiple processed payload data for transmitting to multiple network destinations. In one embodiment, the multiple network destinations may be determined by the protocol control logic 316 or be provided by an external entity or server. For example, two or more network destinations from the plurality of network destinations (e.g., the first network destination 112, second network destination 114 and so on) can be determined for transmitting the multiple segments of the data. Further, as discussed with reference to FIG. 3, the network offloading module 310 may prepare the multiple segments of the data for transmitting to the network destinations via the one or more networks 110 using the network interface 104C.

In step 612, the host device 102 can configure the I/O adapter device 202 to perform data striping if the virtual machine supports the data striping functionality. For example, in one embodiment, the I/O adapter device 202 (e.g., a virtual device running on the I/O adapter device 202) can be configured to perform data striping on behalf of the virtual machine. For example, the data striping capability of the I/O adapter device 202 can be integrated with the virtual machine using an Application Programming Interface. In one embodiment, certain bits in the one or more configuration registers in the configuration module 312 can be configured to indicate that the I/O adapter device 202 can perform data striping on behalf of the virtual machine 102B, i.e., the data striping functionality can be offloaded to the I/O adapter device 202. This can allow better utilization of the memory and compute resources of the host device 102 since the payload data can be fetched once from the host memory and can be stored in the payload buffer 314 on the I/O adapter device 202 or can be processed directly for transmitting to the appropriate network destinations.

In step 614, the I/O adapter device 202 can perform data striping as configured by the virtual machine. As discussed with reference to steps 406-408 in FIG. 4, the I/O adapter device 202 may fetch the data from the host memory 106 and can split the data to perform data striping. In some embodiments, the virtual machine may be running on the one or more processor cores 104A and the payload data may be fetched from the memory 104B. In some embodiments, the I/O adapter device 202 may perform compression and encryption of the data before splitting the data as discussed in FIG. 3 with reference to offload pipeline 206. Further, as discussed with reference to FIG. 3, the data striping module 308B may perform data striping by splitting the data into multiple segments to generate multiple processed payload data for transmitting to multiple network destinations. The multiple network destinations may be predetermined where the data may be transmitted. In one embodiment, the network destinations may be predetermined for the virtual machine for transmitting and/or storing the multiple segments of the data, e.g., at power up or when the virtual machine is created. In one embodiment, the network destinations for the virtual machine may be determined based on an identifier associated with the virtual machine. Further, as discussed with reference to FIG. 3, the network offloading module 310 may prepare the multiple segments of the data for transmitting to the predetermined destinations via the one or more networks 110 using the network interface 104C.

Various embodiments of the disclosed technologies can allow data mirroring and data striping operations to be performed by an I/O adapter device for a virtual machine. The virtual machine may be running an application on the host device or on the I/O adapter device. In one embodiment, the data mirroring and data striping functionalities of the I/O adapter device can be integrated with a virtual machine capable of performing its own data mirroring and data striping in order for the virtual machine to offload the data mirroring and data striping operations to be performed by the I/O adapter device. In another embodiment, the I/O adapter device can perform the data mirroring and data striping operations without the knowledge of the virtual machine. Thus, embodiments of the disclosed technologies can allow improved utilization of the memory and compute resources of the host device, which can result in lower costs for the end consumers.

Figure 7:
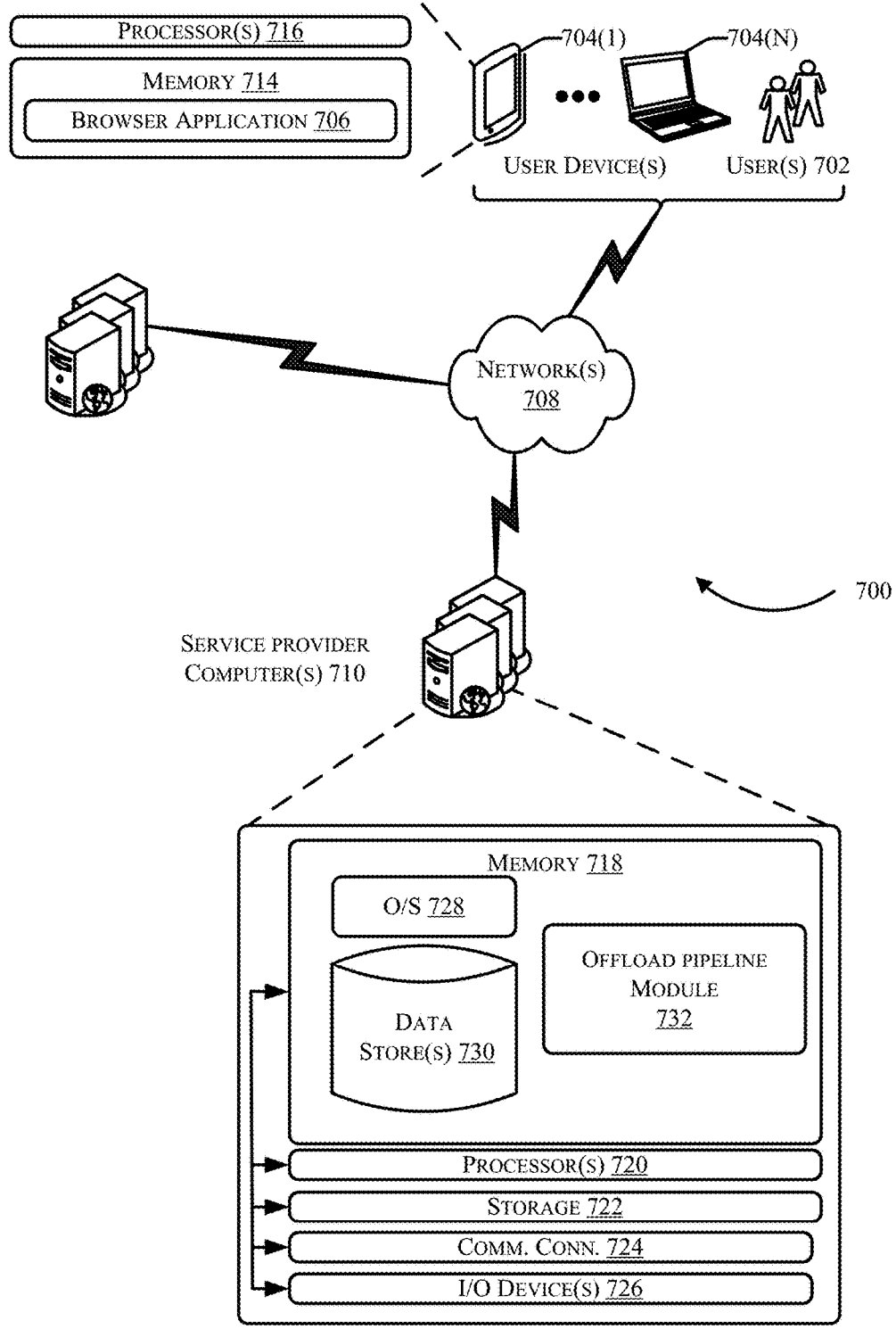
FIG. 7 illustrates an exemplary architecture for features and systems described herein that includes one or more service provider computers and/or a user device connected via one or more networks, according to at least one exemplary embodiment.

FIG. 7 illustrates an exemplary architecture for features and systems described herein that includes one or more service provider computers and/or a user device connected via one or more networks, according to at least one exemplary embodiment. The devices discussed in FIGS. 2-3, may use one or more components of the computing devices described in FIG. 7 or may represent one or more computing devices described in FIG. 7. In architecture 700, one or more users 702 may utilize user computing devices 704(1)-(N) (collectively, user devices 704) to access application 706 (e.g., a web browser or mobile device application), via one or more networks 708. In some aspects, application 706 may be hosted, managed and/or provided by a computing resources service or service provider. One or more service provider computers 710 may provide a native application which is configured to run on user devices 704 which user(s)

702 may interact with. Service provider computer(s) 710 may, in some examples, provide computing resources such as, but not limited to, client entities, low latency data storage, durable data storage, data access, management, virtualization, cloud-based software solutions, electronic content performance management, etc. Service provider computer(s) 710 may also be operable to provide web hosting, computer application development and/or implementation platforms, combinations of the foregoing or the like to user(s) 702. Service provider computer(s) 710, in some examples, may communicate with one or more third party computers 712.

In some examples, network(s) 708 may include any one or a combination of many different types of networks, such as cable networks, the Internet, wireless networks, cellular networks and other private and/or public networks. While the illustrated example represents user(s) 702 accessing application 706 over network(s) 708, the described techniques may equally apply in instances where user(s) 702 interact with service provider computer(s) 710 via user device(s) 704 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 706 may allow user(s) 702 to interact with service provider computer(s) 710 such as to access web content (e.g., web pages, music, video, etc.). Service provider computer(s) 710, perhaps arranged in a cluster of servers or as a server farm, may host application 706 and/or cloud-based software services. Other server architectures may also be used to host application 706. Application 706 may be capable of handling requests from many users 702 and serving, in response, various item web pages. Application 706 can provide any type of website that supports user interaction, including social networking sites, online retailers, informational sites, blog sites, search engine sites, news and entertainment sites and so forth. As discussed above, the described techniques can similarly be implemented outside of application 706, such as with other applications running on user device(s) 1404.

User device(s) 704 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 704 may be in communication with service provider computer(s) 710 via network(s) 708, or via other network connections. Additionally, user device(s) 704 may be part of the distributed system managed by, controlled by or otherwise part of service provider computer(s) 710 (e.g., a console device integrated with service provider computers 710).

In one illustrative configuration, user device(s) 704 may include at least one memory 714 and one or more processing units (or processor(s)) 716. Processor(s) 716 may be implemented as appropriate in hardware, computer-executable instructions, firmware, or combinations thereof. Computer-executable instruction or firmware implementations of processor(s) 716 may include computer-executable or machine-executable instructions written in any suitable programming language to perform the various functions described. User device(s) 704 may also include geo-location devices (e.g., a global positioning system (GPS) device or the like) for providing and/or recording geographic location information associated with user device(s) 704.

Memory 714 may store program instructions that are loadable and executable on processor(s) 716, as well as data generated during the execution of these programs. Depending on the configuration and type of user device(s) 704, memory 714 may be volatile (such as random access memory (RAM)) and/or non-volatile (such as read-only memory (ROM), flash memory, etc.). User device(s) 704 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 714 may include multiple different types of memory, such as static random access memory (SRAM), dynamic random access memory (DRAM), or ROM.

Turning to the contents of memory 714 in more detail, memory 714 may include an operating system and one or more application programs or services for implementing the features disclosed herein including at least a user provided input element or electronic service web page, such as via browser application 706 or dedicated applications (e.g., smart phone applications, tablet applications, etc.). Browser application 706 may be configured to receive, store and/or display a website or other interface for interacting with service provider computer(s) 710. Additionally, memory 714 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 704.

In some aspects, service provider computer(s) 710 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 710 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 710 may be in communication with user device(s) 704 and/or other service providers via network(s) 708, or via other network connections. Service provider computer(s) 710 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 710 may include at least one memory 718 and one or more processing units (or processor(s)) 720. Processor(s) 720 may be implemented as appropriate in hardware, computer-executable instructions, firmware or combinations thereof. Computer-executable instruction or firmware implementations of processor(s) 720 may include computer-executable or machine-executable instructions written in any suitable programming language to perform the various functions described.

In some instances, hardware processor(s) 720 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 718 may store program instructions that are loadable and executable on processor(s) 720, as well as data generated during the execution of these programs. Depending on the configuration and type of service provider computer(s) 710, memory 718 may be volatile (such as RAM) and/or non-volatile (such as ROM, flash memory, etc.). Service provider computer(s) 710 or servers may also include additional storage 722, which may include removable storage and/or non-removable storage. The additional storage 722 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 718 may include multiple different types of memory, such as SRAM, DRAM, or ROM.

Memory 718, the additional storage 722, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 718 and the additional storage 722 are all examples of computer storage media. Additional types of computer storage media that may be present in service provider computer(s) 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 710. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 710 may also contain communications connection(s) 724 that allow service provider computer(s) 710 to communicate with a stored database, another computing device or server, user terminals and/or other devices on network(s) 708. Service provider computer(s) 710 may also include I/O device(s) 726, such as a keyboard, a mouse, a pen, a voice input device, a touch input device, a display, speakers, a printer and the like.

Memory 718 may include an operating system 728, one or more data stores 730 and/or one or more application programs or services for implementing the features disclosed herein, including optionally an offload pipeline module 732. The offload pipeline module 732 may be similar to the offload pipeline 206 as described with reference to FIG. 2. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, and/or functions described herein can be provided by one or more modules that exist as separate modules and/or module functions described herein can be spread over multiple modules.

Figure 8:
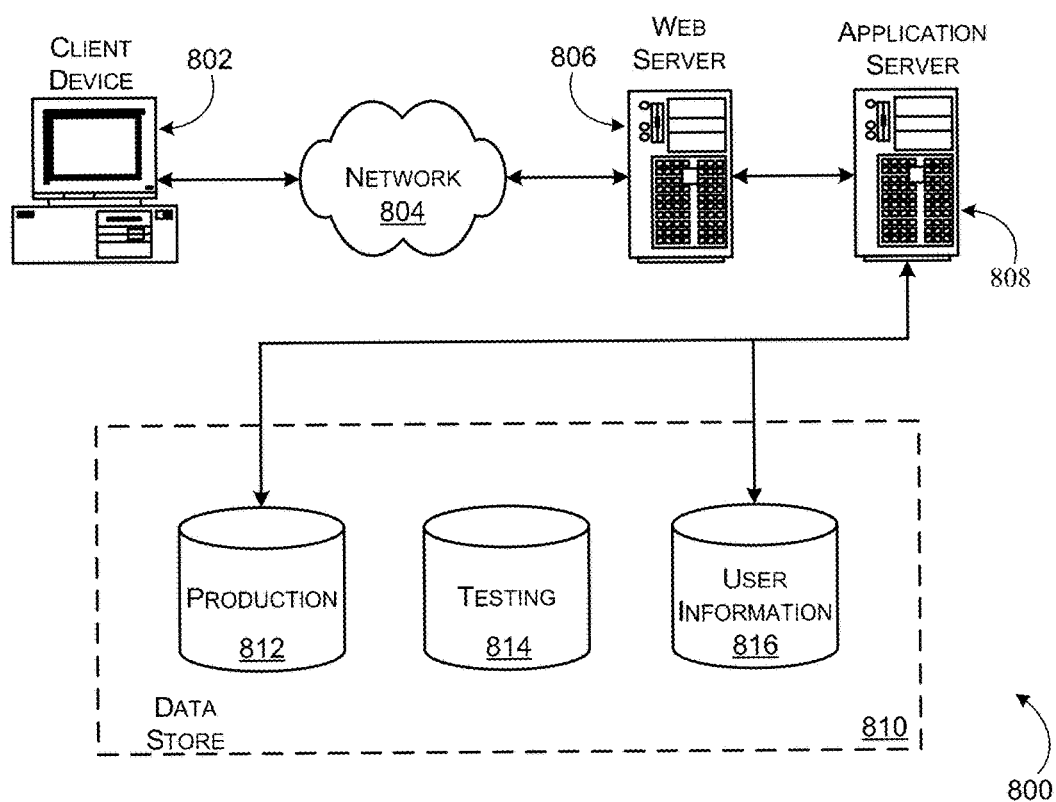
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An Input/Output (I/O) adapter device comprising:
a processor core, wherein the processor core is configured to execute computer-executable instructions;
an offload pipeline for processing I/O requests for a host device, wherein the I/O adapter device is coupled to the host device via a host interface; and
a network interface configured to communicate with a plurality of network destinations via a network,
wherein the offload pipeline is configured to:
receive an I/O request for a transaction;
determine that the transaction is to be transmitted to a plurality of network destinations based on:
identifying that the I/O request is from a particular virtual machine running on the host device, based on an identifier for the virtual machine from the I/O request, and
identifying that the transaction is a particular type of transaction;
fetch payload data for the transaction via the host interface from a host memory coupled to the host device;
process, based on the determination that the transaction is to be transmitted to the plurality of network destinations, the payload data to generate a first processed payload data and a second processed payload data for transmitting a first packet and a second packet to a first network destination and a second network destination respectively from the plurality of network destinations, wherein the first packet includes the first processed payload data and the second packet includes the second processed payload data; and
transmit the first packet to the first network destination and the second packet to the second network destination via the network interface, wherein the first processed payload data and the second processed payload data from the transmitted first packet and the second packet are stored at the first network destination and the second network destination respectively.

2. The I/O adapter device of claim 1, wherein the processing the payload data includes data mirroring to generate the first processed payload data and the second processed payload data, wherein the first packet further includes a first packet header and the second packet further includes a second packet header.

3. The I/O adapter device of claim 1, wherein the processing the payload data includes data striping to generate the first processed payload data and the second processed payload data, wherein the first packet further includes a first packet header and the second packet further includes a second packet header.

4. The I/O adapter device of claim 1, wherein the offload pipeline is further configured to compress or encrypt the payload data before processing the payload data.

5. An Input/Output (I/O) adapter device comprising:
a processor core, wherein the processor core is configured to execute computer-executable instructions,
wherein the I/O adapter device is configured to:
receive an I/O request for a transaction;
determine that the transaction is to be transmitted to a plurality of network destinations based on:
identifying that the I/O request is from a particular virtual machine running on the host device, based on deriving an identifier for the virtual machine from the I/O request, and
identifying that the transaction is a particular type of transaction;
fetch payload data for the transaction from a memory;
process, based on the determination that the transaction is to be transmitted to the plurality of network destinations, the payload data to generate a first processed payload data and a second processed payload data for transmitting a first packet and a second packet to a first network destination and a second network destination respectively from the plurality of network destinations, wherein the first packet includes the first processed payload data and the second packet includes the second processed payload data; and
transmit the first packet to the first network destination and the second packet to the second network destination via one or more networks.

6. The I/O adapter device of claim 5 further comprising:
a data processing module configured to process the payload data to generate the first processed payload data and the second processed payload data, wherein the first packet further includes a first packet header and the second packet further includes a second packet header.

7. The I/O adapter device of claim 6, wherein the processing the payload data includes data mirroring and wherein the first processed payload data includes a first copy of the payload data and the second processed payload data includes a second copy of the payload data.

8. The I/O adapter device of claim 6, wherein the processing the payload data includes data mirroring and wherein the first processed payload data includes the payload data and the second processed payload data includes the payload data.

9. The I/O adapter device of claim 5, wherein the processing the payload data includes data striping and wherein the first processed payload data includes a first segment of the payload data and the second processed payload data includes a second segment of the payload data.

10. The I/O adapter device of claim 5, wherein the I/O adapter device processes the payload data as configured by the virtual machine.

11. The I/O adapter device of claim 5, wherein the first network destination and the second network destination for transmitting the first packet and the second packet are predetermined by the virtual machine.

12. The I/O adapter device of claim 6, wherein the I/O adapter device processes the payload data without being configured by the virtual machine.

13. The I/O adapter device of claim 5, wherein the first network destination and the second network destination for transmitting the first packet and the second packet respectively are determined by the I/O adapter device.

14. The I/O adapter device of claim 5, wherein the virtual machine is running on a host device coupled to the I/O adapter device via a host interface, and wherein the memory is a host memory coupled to the host device.

15. The I/O adapter device of claim 5, wherein the virtual machine is running on one or more processor cores on the I/O adapter device.

16. The I/O adapter device of claim 5 further comprising:
a data encoder module configured to compress or encrypt the payload data before the payload data is processed.

17. The I/O adapter device of claim 5 further comprising:
a payload buffer for storing the payload data prior to processing the payload data for transmitting to the first network destination and the second network destination.

18. A computer-implemented method, comprising:
receiving, by an input/output (I/O) adapter device, an I/O request for a transaction;
determining that the transaction is to be transmitted to a plurality of network destinations based on:
identifying that the I/O request is from a particular virtual machine running on a host device coupled to the I/O adapter device, based on deriving an identifier for the virtual machine from the I/O request, and
identifying that the transaction is a particular type of transaction;
fetching payload data for the transaction from a memory;
processing, based on the determination that the transaction is to be transmitted to the plurality of network destinations, the payload data to generate a first processed payload data and a second processed payload data for transmitting a first packet and a second packet to a first network destination and a second network destination respectively from the plurality of network destinations, wherein the first packet includes the first processed payload data and the second packet includes the second processed payload data; and
transmitting the first packet to the first network destination and the second packet to the second network destination via one or more networks.

19. The method of claim 18, wherein the processing the payload data includes data mirroring to generate the first processed payload data and the second processed payload data for transmitting the first packet and the second packet, wherein the first packet includes a first packet header and the second packet includes a second packet header.

20. The method of claim 18, wherein the processing the payload data includes data striping to generate the first processed payload data and the second processed payload data for transmitting the first packet and the second packet, wherein the first packet includes a first packet header and the second packet includes a second packet header.

* * * * *